US009983663B2

(12) United States Patent
Zhou et al.

(10) Patent No.: US 9,983,663 B2
(45) Date of Patent: May 29, 2018

(54) IMAGING ARRANGEMENT FOR OBJECT MOTION DETECTION AND CHARACTERIZATION

(71) Applicant: QUALCOMM Incorporated, San Diego, CA (US)

(72) Inventors: Ying Zhou, Cupertino, CA (US); Li-Ping Wang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 14/714,086

(22) Filed: May 15, 2015

(65) Prior Publication Data

US 2015/0331480 A1   Nov. 19, 2015

Related U.S. Application Data

(60) Provisional application No. 61/994,789, filed on May 16, 2014.

(51) Int. Cl.
| | |
|---|---|
| G06F 3/00 | (2006.01) |
| G01F 1/32 | (2006.01) |
| G06F 1/32 | (2006.01) |
| G06F 1/16 | (2006.01) |
| G02B 13/18 | (2006.01) |
| G02B 13/00 | (2006.01) |
| H04M 1/02 | (2006.01) |

(52) U.S. Cl.
CPC ............ *G06F 3/005* (2013.01); *G06F 1/1613* (2013.01); *G06F 1/3206* (2013.01); *G06F 1/3231* (2013.01); *G02B 13/003* (2013.01); *G02B 13/18* (2013.01); *H04M 1/0264* (2013.01); *Y02D 10/173* (2018.01)

(58) Field of Classification Search
CPC ...... G06F 3/005; G06F 1/3206; G06F 1/3231; G02B 13/003; G02B 13/18; H04M 1/0264; H04N 5/2254; H04N 2201/02431
USPC ........................................................ 348/335
See application file for complete search history.

(56) References Cited

U.S. PATENT DOCUMENTS

| | | | |
|---|---|---|---|
| 9,390,032 B1 * | 7/2016 | Baldwin | H04N 5/232 |
| 2004/0004726 A1 * | 1/2004 | Sezginer | G03F 7/70633 |
| | | | 356/601 |
| 2005/0157408 A1 * | 7/2005 | Do | G02B 13/003 |
| | | | 359/717 |

(Continued)

FOREIGN PATENT DOCUMENTS

| | | |
|---|---|---|
| DE | 102008052930 A1 | 4/2010 |
| EP | 1555559 A1 | 7/2005 |

OTHER PUBLICATIONS

International Preliminary Report on Patentability dated Sep. 13, 2016 issued in PCT/US2015/031272.

(Continued)

*Primary Examiner* — Nhan T Tran
(74) *Attorney, Agent, or Firm* — Weaver Austin Villeneuve & Sampson LLP (57) ABSTRACT

A vision sensor includes a sensor assembly and a dedicated microprocessor. The sensor assembly includes a pixel array and a lens assembly that is optically coupled with the pixel array. The lens assembly has an F#<2, a total track length less than 4 mm, and a field of view of at least +/−20 degrees. The dedicated microprocessor is configured to perform computer vision processing computations based on image data received from the sensor assembly and includes an interface for a second processor.

27 Claims, 7 Drawing Sheets

(56) References Cited

U.S. PATENT DOCUMENTS

| | | | |
|---|---|---|---|
| 2008/0305828 A1* | 12/2008 | Chang | H04N 5/2254 348/345 |
| 2009/0046380 A1 | 2/2009 | Tang | |
| 2011/0103643 A1* | 5/2011 | Salsman | H04N 5/2253 348/372 |
| 2011/0273546 A1* | 11/2011 | Lin | G06F 1/3231 348/61 |
| 2012/0224272 A1 | 9/2012 | Hsieh | |
| 2013/0021506 A1 | 1/2013 | Attar | |
| 2014/0071522 A1 | 3/2014 | Hsu et al. | |
| 2014/0253677 A1* | 9/2014 | Chen | G02B 13/003 348/36 |
| 2017/0064211 A1 | 3/2017 | Omid-Zohoor | |

OTHER PUBLICATIONS

Second Written Opinion of the International Preliminary Examining Authority dated May 31, 2016 issued in PCT/US2015/031272.
Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.
Chi, Yu M. et al., "CMOS Camera With In-Pixel Temporal Change Detection and ADC," Solid-State Circuits, IEEE Journal of (vol. 42 , Issue: 10 ), pp. 2187-2196 Oct. 2007.
Yoshimura, Shinichi et al., "A 192×124 CMOS Image Sensor with Pixel-Parallel Temporal Computing Architecture," Sony-Kihara Research Center, Inc., pp. 1-4.
International Search Report and Written Opinion—PCT/US2015/031272—ISA/EPO—dated Nov. 16, 2015.

* cited by examiner

| | Radius of Curvature (mm) | Separation Distance (mm) | Conic Constant | Aspherical Coefficients | | | | | |
|---|---|---|---|---|---|---|---|---|---|
| | | | | A2 | A4 | A6 | A8 | A10 | A12 |
| Surface 1 | 3.7407 | 1.218 | -27.90 | -0.05711 | -0.1261 | 0.0204 | -0.1313 | -1.483 | 1.836 |
| Surface 2 | -0.7587 | 0.6662 | -2.527 | 0.2054 | -0.5137 | 0.6253 | -0.9661 | 0.9466 | -0.4246 |
| Surface 3 | -0.5722 | 0.4831 | -0.8480 | -0.0260 | -0.1392 | 0.8545 | -0.2872 | 0.4844 | -0.6263 |
| Surface 4 | -0.6950 | 0.5093 | -2.5 | -0.1390 | -0.2716 | -0.01536 | 0.4295 | 0.09017 | -0.2509 |
| Surface 5 | Infinity | 0.2100 | 0 | / | / | / | / | / | / |
| Surface 6 | Infinity | 0.2475 | 0 | / | / | / | / | / | / |
| Image | Infinity | / | | / | / | / | / | / | / |

IMAGING ARRANGEMENT FOR OBJECT MOTION DETECTION AND CHARACTERIZATION

CROSS-REFERENCE TO RELATED APPLICATIONS

This disclosure claims priority to U.S. Provisional Patent Application No. 61/994,789, filed May 16, 2014, entitled "IMAGING ARRANGEMENT FOR OBJECT MOTION DETECTION AND CHARACTERIZATION" which is hereby incorporated by reference.

TECHNICAL FIELD

This disclosure relates to techniques for object motion detection and characterization for an electronic device, more particularly to an imaging system and optics for recognizing characteristics of an object in motion.

DESCRIPTION OF THE RELATED TECHNOLOGY

As mobile devices become of more importance in daily life there is an increasing demand for detecting and distinguishing features of moving objects. For example, new functions such as device wake-up, detection and recognition of user face, hand or digit, simple gestures (swipe, zoom), complicated gestures (finger counting, pinch), eye tracking, head tracking are highly desired. Desirably, this functionality may always be available even when the device is in a low power mode.

Thus, improved techniques for detecting motion and recognizing characteristics of an object in motion are desirable for numerous types of electronic devices such as smart phones, tablets, and other handheld or wearable electronic devices having a user interface and/or display.

SUMMARY

The systems, methods and devices of this disclosure each have several innovative aspects, no single one of which is solely responsible for the desirable attributes disclosed herein.

One innovative aspect of the subject matter described in this disclosure relates to an imaging system and associated optics that provides low power (<20 mW) computer vision and/or motion detection. The optics are configured to collect enough light to obtain a sufficiently bright image at high frame rate in an arrangement having a small form factor. In some implementations, image processing in software/hardware of the electronic device is avoided in favor of performing motion detection and object characterization in-pixel with hardware.

According to some implementations, a vision sensor includes a sensor assembly including a pixel array and a lens assembly optically coupled with the pixel array and a dedicated microprocessor configured to perform computer vision computations based on image data received from the sensor assembly. The dedicated microprocessor includes an interface for a second processor. The lens assembly has an F#<2, a total track length less than 4 mm, and a field of view of at least +/−20 degrees.

In some examples, the lens assembly may include no lens other than a first aspherical lens and a second aspherical lens.

In some examples, the interface for the second processor may include a wired or wireless communication interface with the second processor. The dedicated microprocessor may be configured to perform the computer vision computations whether or not the second processor is in a normal power mode or a power saving mode. An electronic device may include both the vision sensor and the second processor. In some examples, when the second processor is in the power saving mode, the dedicated microprocessor may be configured to output an event based on the computer vision computations meeting a criteria, the event configured to switch the second processor between the power saving mode and the normal power mode. In some examples, the criteria may relate to a condition for switching the processor from the power saving mode to the normal power mode. In some examples, the criteria may relate to detection of a human face. In some examples, the dedicated microprocessor may consume less power than the second processor.

In some examples, wherein the pixel array comprises a 256 by 256 or smaller array of pixels.

In some examples, the pixel array may be configured to obtain motion and image characteristic information of the object at a frame rate greater than 150 frames per second.

In some examples, the F# may be less than or equal to 1.5.

According to some implementations, a sensor assembly includes a pixel array, the pixel array including a plurality of pixels, optically coupled with a lens assembly that includes a first aspherical lens and a second aspherical lens. The lens assembly includes no more than one lens other than the first aspherical lens and the second aspherical lens, and has an F#<2, a total track length (TTL) less than 4 mm, and a field of view of at least +/−20 degrees. Each pixel includes a detector and at least some of the plurality of pixels are coupled to dedicated processing circuitry. The processing circuitry is configured to obtain to compute computer vision features of an object in an image captured by the pixel array within the field of view.

In some examples, the lens assembly may include no lens other than the first aspherical lens and the second aspherical lens.

In some examples, the pixel array may include M rows and N columns in a rectangular array. M and N may each be in the range of approximately 125 to approximately 250 and the rectangular array may have an area of approximately 4 mm$^2$. The lens assembly may have a modulus of optical transfer function at least 0.4 for all light within the field of view.

In some examples, the rectangular array has a total area, and not less than 70% of the total area may be available for in-pixel processing circuits. In some examples, the TTL is less than 3.5 mm. In some examples, each pixel has an area of approximately 250 μm$^2$. In some examples, the F# is less than or equal to 1.5.

According to some implementations, a lens assembly has an F#<2.0, and a spot size, for visible light of about 550 nm wavelength, not less than 8 μm.

In some examples, the lens assembly may include a first aspherical lens and a second aspherical lens, and may include no lens other than the first aspherical lens and the second aspherical lens.

In some examples, the lens assembly may have a total track length less than 4 mm, and a field of view of at least +/−20 degrees. In some examples, the F# may be less than or equal to 1.5.

According to some implementations, a vision sensor includes a sensor assembly including a pixel array and a lens assembly optically coupled with the pixel array and means for performing computer vision computations based on image data received from the sensor assembly. The lens assembly has an F#<2, a total track length less than 4 mm, and a field of view of at least +/−20 degrees.

In some examples, the means for performing computer vision computations may include an interface for a separate processor and may be configured to perform the computer vision computations whether or not the separate processor is in a normal power mode or a power saving mode, the interface for the separate processor being in wired or wireless communication with the separate processor. An electronic device includes both the vision sensor and the separate processor.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes imaging arrangement. For example, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The systems, methods and devices of the disclosure each have several innovative aspects, no single one of which is solely responsible for the desirable attributes disclosed herein. One innovative aspect of the subject matter described in this disclosure can be implemented in an electronic device such as a smart phone, tablet, or other handheld or wearable electronic device having a user interface and/or a display. According to the presently disclosed techniques, an imaging arrangement enables recognition of objects or gestures, for example, detection or recognition of a face or a non-touching user input such as a hand gesture made in air at a distance removed from the imaging arrangement. The disclosed imaging arrangement operates while consuming a minimal amount of power (less than 20 mW, less than 10 mW, or 0.5 mW or less), and as a result may be "always on", even when the electronic device is in a sleep mode or other power saving mode. It can also be possible to provide for motion detection or contour detection with an imaging system that consumes less than 1 mW. The disclosed imaging system and optics may be packaged in a small form factor (less than 40 cu mm) and may provide image data at a frame rate sufficient to detect motion and recognize characteristics of a fast-moving object at a short viewing distance. For example, in some implementations a frame rate greater than 200 frames per second is contemplated.

The presently disclosed techniques enable detecting and recognizing image characteristics of a stationary or moving object such as a user's hand, digit, handheld object or face. In some implementations, motion of an object is detected. Alternatively or in addition, whether or not the object is moving, the main contours of the object can be identified and characterized to allow, for example, basic recognition of objects such as identifying a given object as a hand or a face. As a result, new user interface functions relating to device wake-up, face/hand/human feature detection and recognition, simple gestures (swipe, zoom), complicated gestures (finger counting, pinch), eye tracking, head tracking and 3D imaging with depth map information on mobile devices may be provided. In some implementations, such user interface functions may be available even when the electronic device is in a "sleep" or other low-power mode. For example, the pixel array may include in-pixel processing circuits in addition to photo detecting elements, which enable motion detection algorithms to be executed in-pixel without a necessity to transfer data to and process the data with a processor of the electronic device.

It has been found that for certain computer vision tasks, such as, for example, face detection (detecting whether a human face is present in a scene) or face recognition (recognizing a detected face as the face of specified individual), as well as other computer vision tasks, a high resolution image is not necessarily needed. Hence, in some implementations, image data is acquired using a per frame pixel count that is low and a corresponding pixel size that is large relative to conventional (e.g., VGA) digital camera systems. As a result, the data volume for each image frame is significantly less than even a medium quality imaging camera. Typically, a digital camera having VGA resolution or higher has a frame rate of 30 to 70 frames per second. Additionally, in optional implementations for detecting a fast moving object (e.g., a waving hand) crossing a field of view of an electronic device at a distance of about 0.2 m or less, a frame rate on the order of 200-500 Hz can improve detection.

The presently disclosed techniques contemplate a compact optics arrangement that collects sufficient light during short exposure times associated with the desired high frame rate. In some implementations, high-performance optics having, for example, an F# of 1.5 or less are contemplated. Cost, complexity and volume of the optics are reduced, in some implementations by configuring a lens assembly to include no more than two lens elements.

Thus, an imaging system and associated optics will be described that provides low power (<20 mW) computer vision and/or motion detection. The optics are configured to collect enough light to obtain a sufficiently bright image at the required frame rate in an arrangement having a small form factor (e.g., 3 mm×3 mm×4 mm vs. a conventional arrangement that is 5 mm×5 mm×6 mm). In some implementations, the optics arrangement may have a total track length (TTL) of 3.5 mm or less. In some implementations, image processing in software/hardware of the electronic device is avoided in favor of performing motion detection and object characterization in-pixel with hardware.

In some implementations, the disclosed imaging system and associated optics may be used on a device that also includes a conventional camera designed for capturing high quality images. The conventional camera may have a higher resolution (minimal VGA), low aberration, vivid color, and high dynamic range, at least where the frame rate is relatively low (30-70 fps). The data processing requirements and power draw for such high resolution cameras are far in excess of that required for the presently disclosed imaging system. For example, a medium quality imaging camera for mobile devices has VGA resolution (640×480 pixels) but the presently contemplated resolution may be in the range of 125×125 to 256×256 pixels. The conventional camera has a typical F# larger than 2.2 and, as a result, the typical imaging camera used in mobile devices does not collect sufficient light with short exposure time in order to achieve a high refresh rate. In contrast, the presently disclosed imaging system may provide for an F# in the range of 1.4-2.0, in a small form factor arrangement.

Figure 1A:
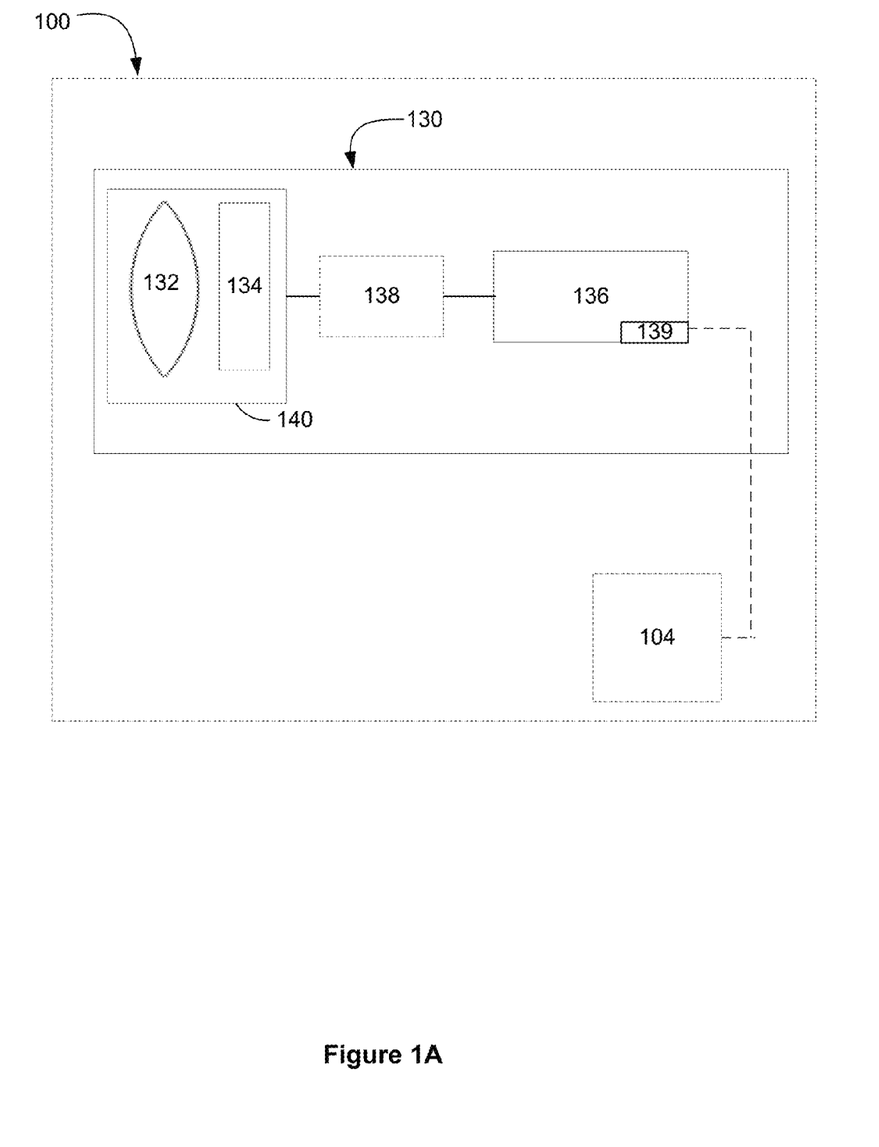
FIG. 1A shows an example of a vision sensor for low power computer vision applications including a lens assembly.

FIG. 1A shows an example of a vision sensor for low power computer vision applications including a lens assembly. In the illustrated implementation, the vision sensor 130 includes a lens assembly 132 optically coupled to a pixel array 134. The lens assembly 132 and the pixel array 134 together form a sensor assembly 140. The lens assembly 132 is described in further detail with reference to FIGS. 2 through 6. The pixel array 134 can include an M×N array of pixels, where the numbers M and N may be the same or different. Each pixel may include a detector, such as a photo diode or other light sensing element and at least some of the pixels are coupled to and/or include dedicated, passive and/or active, processing circuitry (such processing circuitry may include, for example, one of, or both of, dedicated microprocessor 136 and computer vision computation hardware 138, described further below). In different implementations, the pixel array 134 may be a 256×256 array of pixels or a 128×128 array of pixels. The pixel array 134 can be electronically coupled to a dedicated microprocessor 136. The dedicated microprocessor may be a special purpose, low power, microprocessor designed to receive image data input from the pixel array 134 and perform computer-vision-based recognition and/or detection of objects in images captured by the pixel array 134. Such computer-vision-based recognition and/or detection can include computation of computer vision features, such as local binary patterns (LBP), for each pixel in the pixel array based on the values of pixels neighboring the subject pixel. Other computer vision features are also known, such as local ternary patterns, histogram of oriented gradients, as well as others. The dedicated microprocessor can then perform face detection and/or recognition using the computed computer vision features. Other computer-vision-based recognition and/or detection can include edge detection, corner detection, blob detection, etc. The computer-vision-based recognition and/or detection can include, based on the computed computer vision features, a wide range tasks such as determining the existence of a face, the identity of a face, emotions expressed in a face, whether the face is a male or female, an approximate age of a face, the presence of a hand or other specified object, tracking of a face, hand or other specified object, recognition of facial or hand gestures, as well as other computer-vision-based tasks.

Optionally, to accelerate computer-vision-based recognition and/or detection being performed on the dedicated microprocessor, computation acceleration hardware, such as dedicated computer vision computation hardware 138, may receive the image data from the pixel array, compute computer vision features such as LBP, and output such computed computer vision features to the dedicated microprocessor 136. The dedicated microprocessor 136, in this optional implementation, may then perform the computer-vision-based recognition and/or detection tasks mentioned above based on the hardware computed computer vision features. Although illustrated as a block peripheral to pixel array 134, it is understood that part or all of the computer vision computation hardware 138 may be implemented "in pixel." That is, the computer vision computation hardware 138 need not be peripheral to the pixel array 134 as illustrated and instead may be composed, wholly or in part, of in-pixel processing circuits that are part of each pixel in the pixel array 134. In some implementations, parts of the computer vision computation hardware 138 may be integrated with the pixel array 134 through in-pixel circuitry and parts of the computer vision computation hardware 138 may be implemented as hardware peripheral to the pixel array 134.

The dedicated microprocessor 136, then, need not be a general purpose processor but may be designed primarily for computer-vision-related tasks using input from the pixel array 134 (with or without computer vision computation hardware 138). It is understood that dedicated microprocessor 136 may have some minor other processing tasks based on inputs from other sensors, such as an ambient light sensor, an accelerometer, or other sensors. In addition to performing computer-vision-related tasks, the dedicated microprocessor 136 may communicate with other processors. For example, in the illustrated implementation, dedicated microprocessor 136 includes an interface 139 for communication with a second processor 104. The second processor 104 may include an applications processor of an electronic device 100, such as a mobile phone. In such an example, the applications processor 104 can be the main processor of the mobile phone. The interface 136 for communication can include a wired interface capable of communication with the applications processor 104 and configured to communicate using one of an SPI, I2C, LVDS, or other wired communications protocol. In such an implementation, after performing a computer-vision-related task, the dedicated microprocessor 136 sends an event to the applications processor 104 based on the computer-vision-related task. For example, the task could be a face detection task, and the event could be a face detected event. The applications processor 104 can be in either a normal power mode or a power saving mode. In the normal power mode, the power draw of the applications processor 104 may be considerably greater than the power draw of the dedicated microprocessor 136. If in the power saving mode, the applications processor 104 can be configured to wake up or enter a normal mode based on receipt of the event. Once awakened, the applications processor 104 may perform a certain task based on the event received. For example, if the event is a face detected event, the applications processor 104 may then execute instructions related to prompting a user to unlock the device with a password or a gesture. If the event is a face recognition event, and the face recognized is an authorized user, the applications processor 104 may then execute instructions related to displaying a main screen to the user or displaying the screen most recently used by the authorized user. In another example, if the event is a gesture recognition event, the applications processor 104 may then execute instructions related to the gesture recognized. In some implementations, the dedicated microprocessor 136 can operate at a lower power processor than the second processor. In other implementations, the applications processor 104 is a microprocessor of another kind of electronic device 100, such as a toy which uses output from the vision sensor to do something, such as make a sound. In such an implementation, for example, the dedicated microprocessor performs a computer-vision-related task, and sends an event based on the computer-vision-related task to the applications processor 104, which can then control a speaker in the toy to make the sound. In such an implementation, the dedicated microprocessor 136 and the applications processor 104 may consume similar amounts of power, or, in some implementations, the dedicated microprocessor 136 may even consume more than the applications processor 104. Although the interface 139 is illustrated as a wired interface, it is also understood that the dedicated microprocessor 136 can be configured to include an interface 139 for communication with the applications processor 104 that is wireless, for example, using a Zigbee (IEEE 802.15.4 standard), Bluetooth, body area network (IEEE 802.15.6), wireless USB, Wi-Fi (802.11), Z-wave, or IrDA (IR-based communications) communications protocol.

Figure 1B:
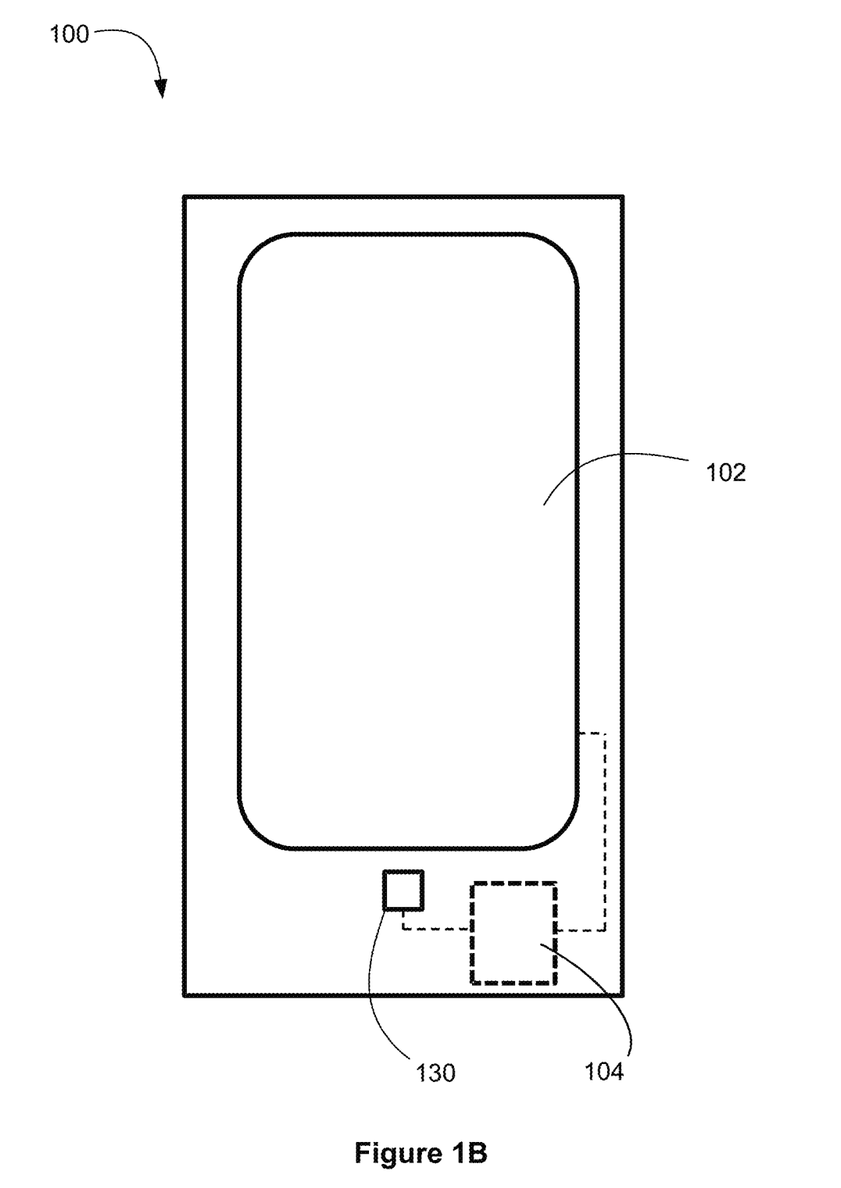
FIG. 1B shows an example of an implementation of an electronic device including the vision sensor of FIG. 1A.

FIG. 1B shows an example of an implementation of an electronic device including the vision sensor of FIG. 1A. In the illustrated implementation, electronic device 100 includes the second processor 104 and vision sensor 130. The electronic device 100 may also include an interactive display 102, which may be a touch screen display, but this is not necessarily so. As described above, the second processor 104 may be or include an applications processor and may be configured to control the electronic device 100, including the interactive display 102, responsive, at least in part, to user inputs. At least some of the user inputs may be made by way of "gestures", which include gross motions using a user's appendage, such as a hand or a finger, or a handheld object or the like, and facial expressions or movements, which may be received and interpreted using the vision sensor 130. The gestures may be made at a distance ranging between, for example, 10 cm to 200 cm from device 100. As described in connection with FIG. 1A, the vision sensor 130 (examples of which are described and illustrated herein below) may include a pixel array and a dedicated microprocessor that performs computer-vision-related tasks. Signals outputted by the vision sensor 130, for example an event, based on the computer-vision-related tasks, may cause the second processor 104 to switch between a normal power mode and a power saving mode, and/or cause the second processor 104 to recognize an instance of a user gesture or face detection/recognition, and to control the electronic device 100 and/or interactive display 102 responsive to the user gesture or the face detection/recognition. In some implementations, the electronic device 100 senses and reacts in a deterministic way to a user's gesture.

As described in more detail hereinbelow, the presently disclosed techniques contemplate that the pixel array in the vision sensor 130 may be monochromatic and relatively coarse compared, for example, to a VGA camera. As a result, images may be collected at a high frame rate, and computer-vision-related tasks can be performed using the dedicated microprocessor 136 at a very low power cost since the second, higher power processor 104 of the electronic device 100 may be in a power saving mode while computer-vision-related tasks are performed. As a result, a non-touch user gesture may be effective to "wake" the electronic device 100 from a low-power sleep mode. In some implementations, the image arrangement 130 may detect presence/movement/turning/shift of a human appendage, head or face which may trigger a "wake-up" or "turn-off" action for device 100. For example, a hand wave or finger flick type of gesture, made at a distance of 10-200 cm from the electronic device 100 may be effective to wake the electronic device 100.

Figure 2:
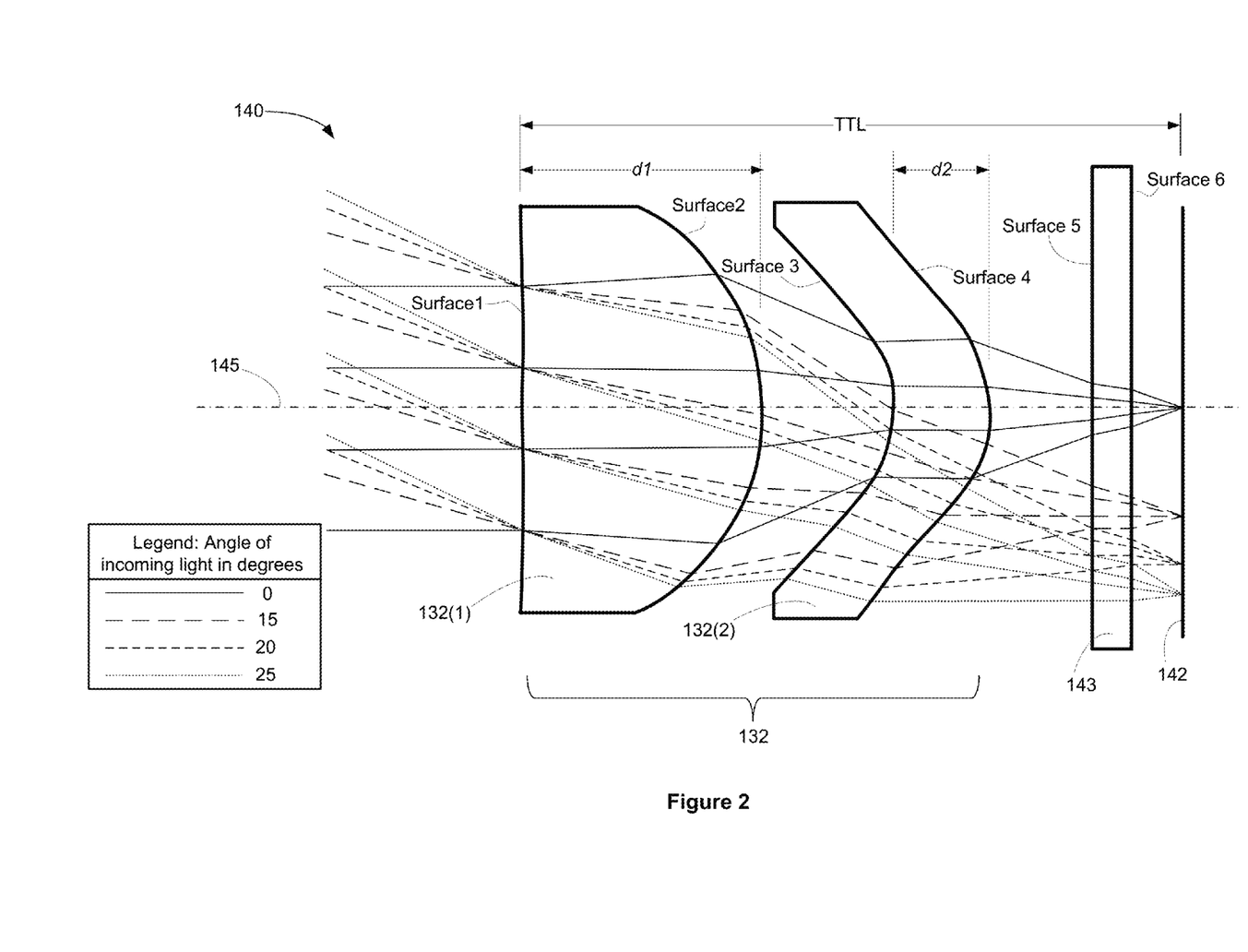
FIG. 2 shows an example of an implementation of an imaging arrangement.

FIG. 2 illustrates example of an implementation of a sensor assembly. The sensor assembly 140 may include a pixel array disposed in an image plane 142 and a lens assembly 132. In the illustrated implementation, a cover glass 143 is disposed between the image plane 142 and the lens assembly 132.

In the illustrated implementation, the lens assembly 132 has two aspherical lenses, which will be referred to herein as outer lens element 132(1) and inner lens element 132(2). In some implementations, the only lenses included in the sensor assembly 140 are the outer lens element 132(1) and the inner lens element 132(2). In other words, in some implementations, the lens assembly 132 includes no lens other than a first aspherical lens and a second aspherical lens.

In some implementations, the pixel array disposed on the image plane 142 is sized to have M rows by N columns of pixels, where the values of M and N are each in a range between about 100 to 300. For example, in some implementations, each of M and N is 128. In such implementations, it is contemplated that the pixel array may be arranged in a rectangular arrangement approximately 2 mm×2 mm in size. Each pixel, in such implementations, may have a planar area of approximately 250 $\mu m^2$ (15.6 $\mu m$×15.6 $\mu m$) and may include a photo detecting element having an area approximately 20 to 25% of the pixel's area, with the remaining 75 to 80% reserved, in an optional implementation, for in-pixel processing circuits. Thus, a pixel photo detecting area may be approximately (8 µm×8 µm) or less.

Referring still to FIG. 2, a total track length (TTL) is defined as the distance, along optical axis 145, between image plane 142 and an outer surface ("Surface 1") of the outer lens element 132(1). In some implementations, the sensor assembly 140 is configured such that the TTL is less than 4 mm and the lens arrangement 132 is characterized by F#<2. The present inventors have found that, for example, an F# no greater than 1.5 may be obtained while obtaining a TTL no greater than 3.5 mm. In some implementations, the F# can range between 1.0 to 1.5 and the TTL may be approximately 3 mm. The above mentioned F# and TTL may, in some implementations, be achieved simultaneously with a relatively large spot size, as described elsewhere herein.

One or both of the outer lens element 132(1) and the inner lens element 132(2) may be fabricated from a highly refractive material, having, for example, a refractive index in the range of 1.5 to 1.7. For example, one or both of the outer lens element 132(1) and the inner lens element 132(2) may be fabricated from a plastic OKP4, available from Osaka Gas Chemicals, having a refractive index of at least 1.6. In some implementations, the cover glass 143 may be fabricated from a crown glass, such as BK7. In some implementations, the cover glass may include a filter coating that is at least partially opaque to infrared light.

It is contemplated that the sensor assembly 140 may be configured to have a field of view (FOV) of at least +/−20°. In some implementations, the FOV may be within the range of +/−25-30°.

In some implementations, the sensor assembly 140 may be configured such that it has a system effective focal length ("f") within the range of approximately 1.5-2 mm. In some implementations, the imaging arrangement may be optimized for an object distance of approximately 1 meter, a target object size less than 1 meter and assuming a central wavelength in the visible range of approximately 550 nm. For the example sensor assembly 140 illustrated in FIG. 2, chromatic aberration may be disregarded, because it is contemplated that the sensor assembly 140 is to be used, at least primarily, in a monochromatic (gray level) mode only.

In some implementations, where each of the outer lens element 132(1) and the inner lens element 132(2) has a respective effective focal length ("f1") and ("f2") and a respective center thickness ("d1") and ("d2"), the following relationships are maintained.

$$0.7 < f/f1 < 1.2,$$

$$0.35 < f/f2 < 0.7$$

$$0.3 < f/f1 - f/f2 < 0.7$$

$$0.25 < d1/TTL < 0.55$$

$$0.1 < d2/TTL < 0.25$$

Figure 3:
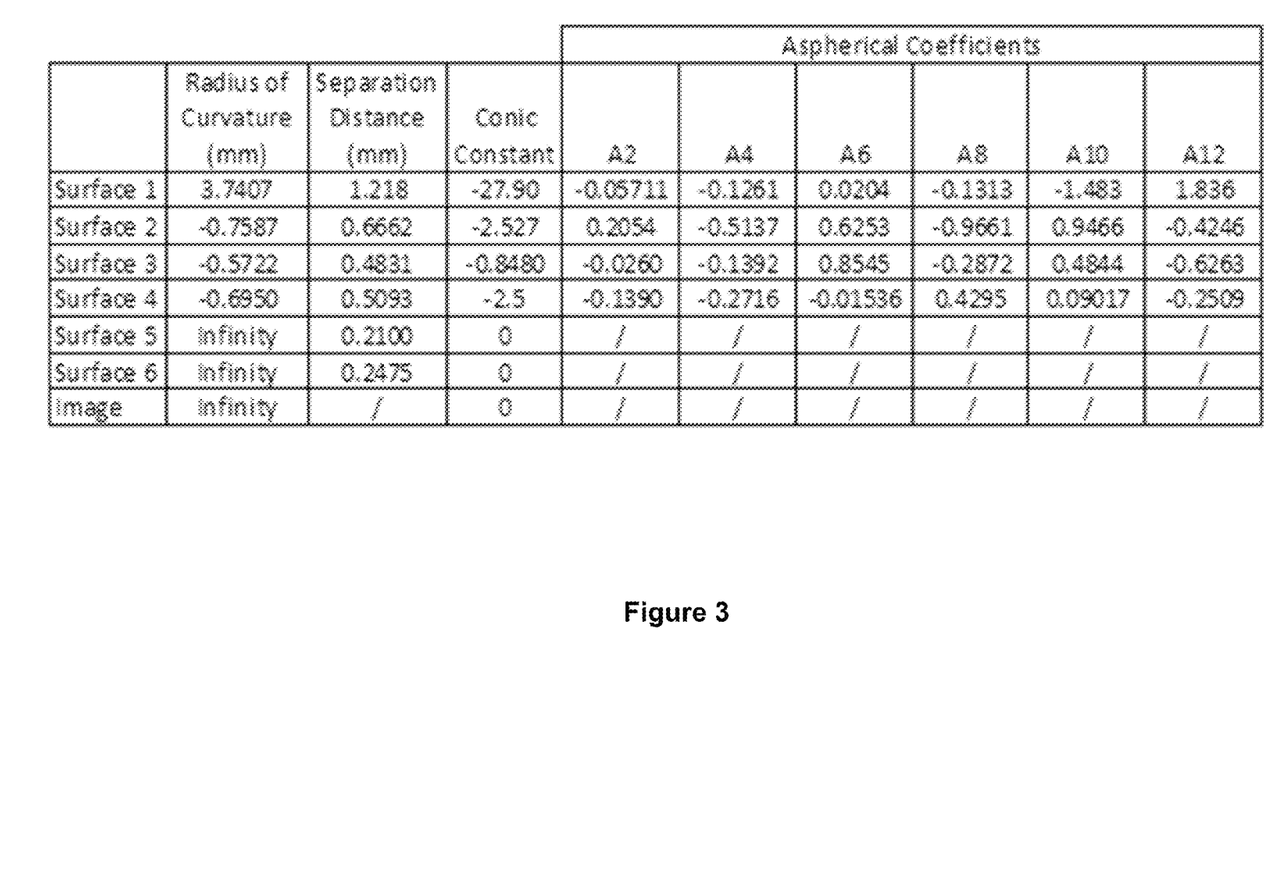
FIG. 3 illustrates examples of lens parameters for the imaging arrangement implementation illustrated in FIG. 2.

FIG. 3 illustrates examples of lens parameters for the imaging arrangement implementation illustrated in FIG. 2.

Figure 4:
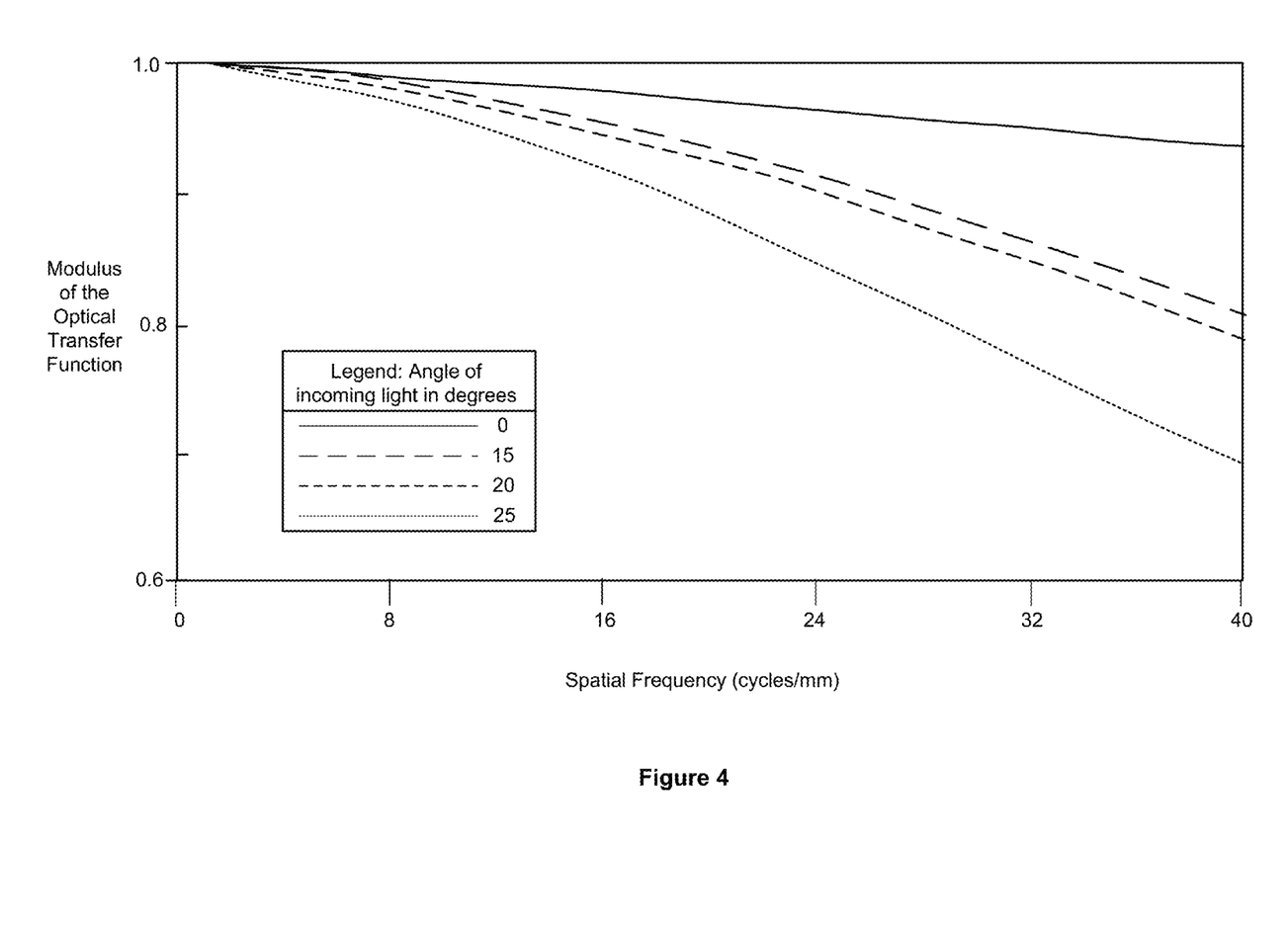
FIG. 4 illustrates estimated modulus of the optical transfer function (OTF) as a function of spatial frequency in cycles per millimeter.

FIG. 4 illustrates estimated modulus of the optical transfer function (OTF) as a function of spatial frequency in cycles per millimeter. In an implementation contemplated by the present disclosure, where the pixel array includes 128×128 pixels in a 4 mm² square array, the characteristic spatial frequency (Nyquist frequency) is approximately 32 cycles per millimeter. Assuming an extreme incoming light angle of 25°, the estimated modulus of OTF is greater than 0.75. For incoming light angles less than 20°, the estimated modulus of OTF is shown to be greater than 0.85.

Figure 5:
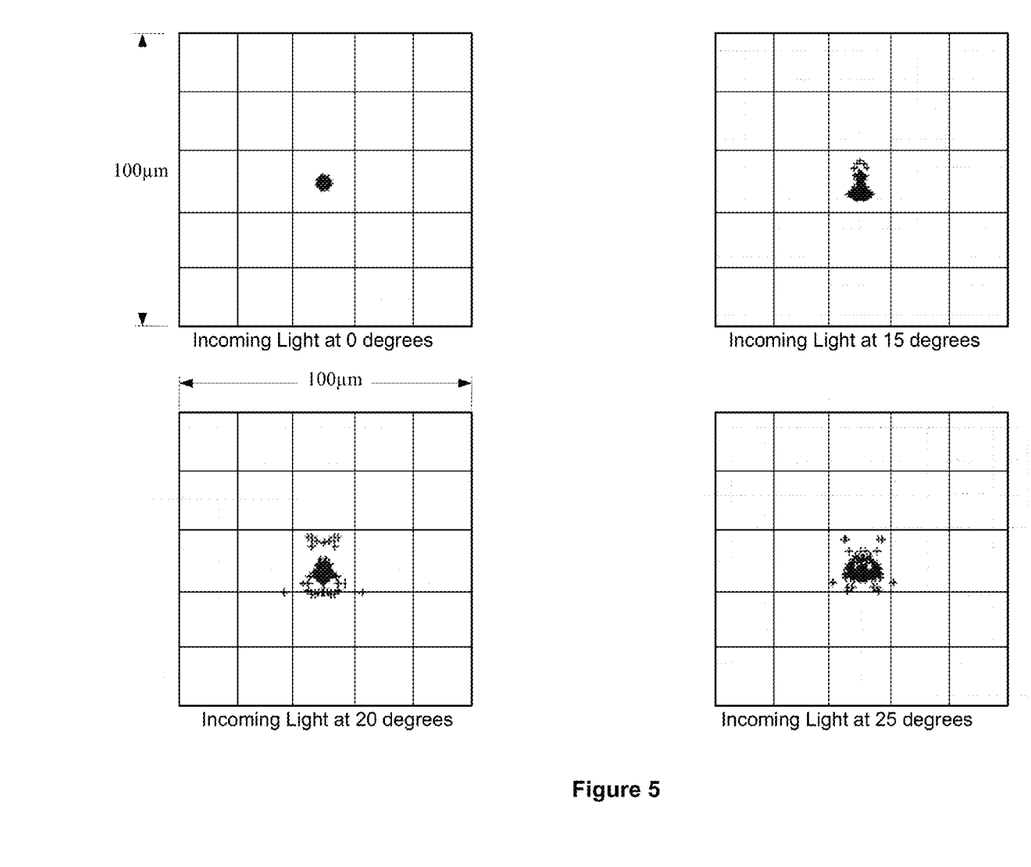
FIG. 5 illustrates the spatial aberration of a spot image for incoming light angles of 0, 15, 20, and 25 degrees.

FIG. 5 illustrates the spatial aberration of a spot image for incoming light angles of 0, 15, 20, and 25 degrees. It may be observed that the spot size varies from about 8 µm, for incoming light at 0 degrees, to 20 µm for incoming light at 25 degrees. The illustrated performance is satisfactory in view of the pixel size of the presently disclosed sensor assembly.

Figure 6:
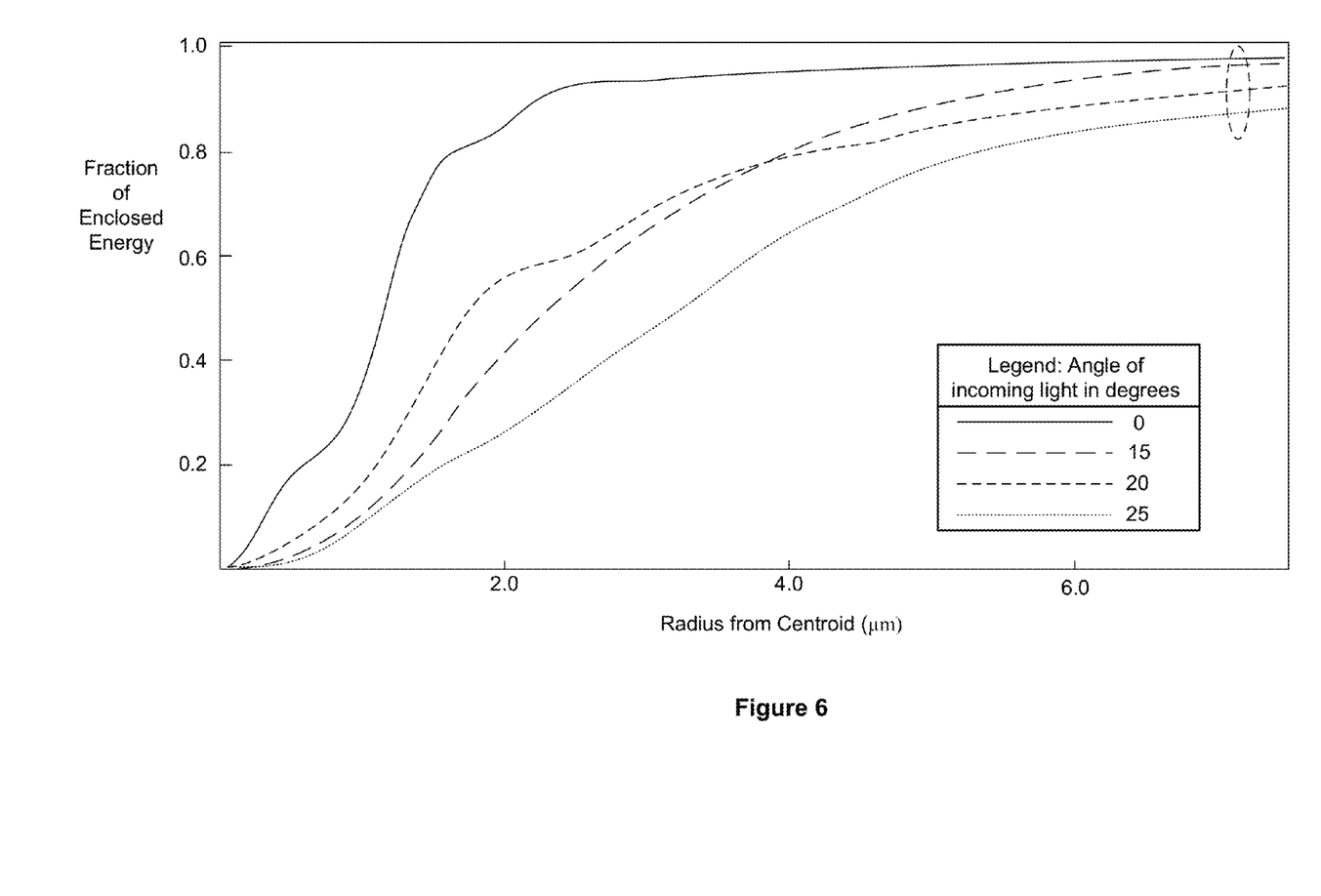
FIG. 6 illustrates a fraction of the enclosed energy as a function of radius from centroid for incoming light angles of 0, 15, 20, and 25 degrees.

FIG. 6 illustrates a fraction of the enclosed energy as a function of radius from centroid for incoming light angles of 0, 15, 20, and 25 degrees. It may be observed that within the contemplated pixel radius of about 7.8 µm, the enclosed energy fraction exceeds 80%.

Thus, improved techniques for object motion detection and image characterization have been disclosed. Additional features of the presently disclosed techniques are described in Appendix A of the present application.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A vision sensor comprising:
    a sensor assembly including a pixel array disposed on a flat image plane and a lens assembly optically coupled with the pixel array; and
    a dedicated microprocessor configured to perform computer vision computations based on image data received from the sensor assembly, the dedicated microprocessor including an interface for a second processor;
    wherein the lens assembly has an F#<2, a total track length less than 4 mm, and a field of view of at least +/−20 degrees.

2. The vision sensor of claim 1, wherein the lens assembly includes no lens other than a first aspherical lens and a second aspherical lens.

3. The vision sensor of claim 1, wherein:
    the interface for the second processor includes a wired or wireless communication interface with the second processor;
    the dedicated microprocessor is configured to perform the computer vision computations whether or not the second processor is in a normal power mode or a power saving mode; and
    an electronic device includes both the vision sensor and the second processor.

4. The vision sensor of claim 3, wherein, when the second processor is in the power saving mode, the dedicated microprocessor is configured to output an event based on the computer vision computations meeting a criteria, the event configured to switch the second processor between the power saving mode and the normal power mode.

5. The vision sensor of claim 4, wherein the criteria relates to a condition for switching the processor from the power saving mode to the normal power mode.

6. The vision sensor of claim 5, wherein the criteria relates to detection of a human face.

7. The vision sensor of claim 3, wherein the dedicated microprocessor consumes less power than the second processor.

8. The vision sensor of claim 1, wherein the pixel array comprises a 256 by 256 or smaller array of pixels.

9. The vision sensor of claim 1, wherein the pixel array is configured to obtain motion and image characteristic information of the object at a frame rate greater than 150 frames per second.

10. The vision sensor of claim 1, wherein the F# is less than or equal to 1.5.

11. A sensor assembly comprising:
    a pixel array, the pixel array including a plurality of pixels disposed on a flat image plane, optically coupled with a lens assembly that includes a first aspherical lens and a second aspherical lens; wherein:
    the lens assembly includes no more than one lens other than the first aspherical lens and the second aspherical lens, and has an F#<2, a total track length (TTL) less than 4 mm, and a field of view of at least +/−20 degrees;

each pixel includes a detector and at least some of the plurality of pixels are coupled to dedicated processing circuitry; and the processing circuitry is configured to obtain to compute computer vision features of an object in an image captured by the pixel array within the field of view.

12. The sensor assembly of claim 11, wherein the lens assembly includes no lens other than the first aspherical lens and the second aspherical lens.

13. The sensor assembly of claim 11, wherein the pixel array includes M rows and N columns in a rectangular array.

14. The sensor assembly of claim 13, wherein M and N are each in the range of approximately 125 to approximately 250 and the rectangular array has an area of approximately 4 mm$^2$.

15. The sensor assembly of claim 14, wherein the lens assembly has a modulus of optical transfer function at least 0.4 for all light within the field of view.

16. The sensor assembly of claim 11, wherein the rectangular array has a total area, and not less than 70% of the total area is available for in-pixel processing circuits.

17. The sensor assembly of claim 11, wherein the TTL is less than 3.5 mm.

18. The sensor assembly of claim 11, wherein each pixel has an area of approximately 250 μm$^2$.

19. The sensor assembly of claim 11, wherein the F# is less than or equal to 1.5.

20. A vision sensor comprising:
a sensor assembly including a pixel array disposed on a flat image plane and a lens assembly optically coupled with the pixel array; and
means for performing computer vision computations based on image data received from the sensor assembly;
wherein the lens assembly has an F#<2, a total track length less than 4 mm, and a field of view of at least +/−20 degrees.

21. The vision sensor of claim 20, wherein the lens assembly includes no lens other than a first aspherical lens and a second aspherical lens.

22. The vision sensor of claim 20, wherein
the means for performing computer vision computations includes an interface for a separate processor and is configured to perform the computer vision computations whether or not the separate processor is in a normal power mode or a power saving mode, the interface for the separate processor being in wired or wireless communication with the separate processor; and
an electronic device includes both the vision sensor and the separate processor.

23. The vision sensor of claim 22, wherein, when the separate processor is in the power saving mode, the means for performing computer vision computations is configured to output an event based on the computer vision computations meeting a criteria, the event configured to switch the second processor between the power saving mode and the normal power mode.

24. The vision sensor of claim 23, wherein the criteria relates to a condition for switching the processor from the power saving mode to the normal power mode.

25. The vision sensor of claim 24, wherein the criteria relates to detection of a human face.

26. The vision sensor of claim 22, wherein, the pixel array comprises a 256 by 256 or smaller array of pixels.

27. The vision sensor of claim 20, wherein the means for performing computer vision computations consumes less power than the separate processor.

* * * * *